(12) United States Patent
Rockwell et al.

(10) Patent No.: US 7,978,943 B2
(45) Date of Patent: Jul. 12, 2011

(54) MONOLITHIC PUMP COUPLER FOR HIGH-ASPECT RATIO SOLID-STATE GAIN MEDIA

(75) Inventors: David Alan Rockwell, Culver City, CA (US); Vladimir V. Shkunov, Torrance, CA (US); Joshua Nathan Wentlandt, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 116 days.

(21) Appl. No.: 12/357,540

(22) Filed: Jan. 22, 2009

(65) Prior Publication Data

US 2010/0183260 A1     Jul. 22, 2010

(51) Int. Cl.
*G02B 6/42* (2006.01)
*G02B 6/26* (2006.01)

(52) U.S. Cl. ............................................ 385/43; 385/39

(58) Field of Classification Search .................... 385/36, 385/39, 43; 372/6
See application file for complete search history.

(56) References Cited

U.S. PATENT DOCUMENTS

| | | | |
|---|---|---|---|
| 4,134,640 A | 1/1979 | Auracher et al. | |
| 4,553,238 A | 11/1985 | Shaw et al. | |
| 4,815,079 A * | 3/1989 | Snitzer et al. | 372/6 |
| 4,818,062 A | 4/1989 | Scifres et al. | |
| 4,848,881 A | 7/1989 | Kahan et al. | |
| 5,046,809 A | 9/1991 | Stein | |
| 5,386,427 A | 1/1995 | Zayhowski | |
| 5,646,773 A | 7/1997 | Injeyan et al. | |
| 5,864,644 A | 1/1999 | DiGiovanni et al. | |
| 5,909,529 A | 6/1999 | Bhagavatula | |
| 5,930,433 A | 7/1999 | Williamson et al. | |
| 6,014,391 A | 1/2000 | Byren | |
| 6,229,939 B1 | 5/2001 | Komine | |
| 6,317,548 B1 | 11/2001 | Rockwell et al. | |
| 6,370,297 B1 * | 4/2002 | Hakimi et al. | 385/27 |
| 6,400,871 B1 | 6/2002 | Minden | |
| 6,477,295 B1 | 11/2002 | Lang et al. | |
| 6,529,318 B1 | 3/2003 | Kaneda et al. | |
| 6,594,420 B1 | 7/2003 | Lange et al. | |
| 6,888,859 B2 | 5/2005 | Weber et al. | |

(Continued)

FOREIGN PATENT DOCUMENTS

EP         0320990 A2      6/1989

(Continued)

OTHER PUBLICATIONS

Hakimi et al., "A new side coupling method for double-clad fiber amplifiers", Conf. on Lasers and Electro-Optics (CLEO 2001) Technical Digest. Postconf. Ed., vol. 65, pp. 116-116 (May 2001).

(Continued)

*Primary Examiner* — Rhonda S Peace
(74) *Attorney, Agent, or Firm* — Pillsbury Winthrop Shaw Pittman LLP (57) ABSTRACT

In one or more embodiments, an optical fiber coupler for coupling pump radiation into a rectangular optical fiber includes a fiber section and a pump fiber. The fiber section includes a core having a high aspect ratio cross-section and an interface section. The core is positioned in contact with first and second signal claddings to form reflective boundaries at fast-axis boundaries of the core. The pump fiber is side coupled to the fiber section via the interface section, and configured to couple the pump radiation into the fiber section.

28 Claims, 10 Drawing Sheets

U.S. PATENT DOCUMENTS

| | | | |
|---|---|---|---|
| 6,904,219 B1* | 6/2005 | Fermann | 385/130 |
| 7,164,818 B2 | 1/2007 | Bryan et al. | |
| 7,277,612 B2* | 10/2007 | Sintov | 385/43 |
| 7,539,377 B2* | 5/2009 | Gonthier | 385/39 |
| 2004/0076197 A1 | 4/2004 | Clarkson et al. | |
| 2009/0041061 A1 | 2/2009 | Shkunov et al. | |

FOREIGN PATENT DOCUMENTS

| | | |
|---|---|---|
| EP | 1059707 A2 | 12/2000 |
| WO | 00/40893 A1 | 7/2000 |

OTHER PUBLICATIONS

European Search Report dated Mar. 18, 2010 of EP Application No. 10151169.9 filed Jan. 20, 2010 (7 Sheets).

Born et al. "The Refracting Telescope", Principles of Optics, Electromagnetic Theory of Propagation, Interference and Diffraction of Light, Chapter 6.3, pp. 267-268, Cambridge University Press, 1968.

Neumann "Wave Beam Guided by a Straight Single-Mode Fiber", Chapter 2.2-2.4, pp. 12-16, Single-Mode Fibers Fundamentals, Springer-Verlag, NY, 1988.

Neumann "The Fundamental Fiber Mode", Chapter 5, pp. 61-141, Single-Mode Fibers Fundamentals, Springer-Verlag, NY, 1988.

Tamir "Waveguide Horns", Chapter 3.5, pp. 125-134, Guided-Wave Optoelectronics, Springer-Verlag, Berlin, 1988.

Bass et al. "Optical Elements", pp. 6.22, Handbook of Optics, vol. 11, Devices, Measurements and Properties, McGraw-Hill, Inc. NY, 1995.

Bass et al. "Axial Gradient Lenses", pp. 9.5, Handbook of Optics, vol. 11, Devices, Measurements and Properties, McGraw-Hill, Inc. NY, 1995.

Taverner et al. "158-uJ Pulses from a Single-Transverse-Mode, Large-Mode-Area Erbium-Doped Fiber Amplifier", pp. 378-380, Optics Letters, vol. 22, No. 6, Mar. 15, 1997, Optical Society of America.

Arkwright et al. "Experimental and Theoretical Analysis of the Resonant Nonlinearity in Ytterbium-Doped Fiber", pp. 798-806, Journal of Lightwave Technology, vol. 16, No. 5, May 1998.

Snyder et al. "Step-Profile Waveguides", Chapter 12, pp. 239-248, Optical Waveguide Theory, Kluwer Academic Pubishers, Boston, 2000.

Koechner "Thermo-Optic Effects and Heat Removal", Chapter 7, pp. 406-468, Optical Sciences, Solid-State Laser Engineering, Fifth Edition, Springer-Verlag, NY, 2000.

Siegman "Propagating Modes in Gain-Guided Optical Fibers", pp. 1617-1628, Optical Society of America, vol. 20., No. 8, Aug. 2003.

Hecht "Optical Systems", Chapter 5.7, pp. 209, Optics, Fourth Edition, Pearson Education, Singapore, 2004.

Witkowska et al. "All-Fiber Anamorphic Core-Shape Transitions", pp. 2672-2674, Optics Letters, vol. 31, No. 18, Sep. 15, 2006, Optical Society of America.

Ramachandran et al. "Scaling to Ultra-Large-Aeff Using Higher-Order-Mode Fibers", 2 pp., CThAA2, Conference on Lasers and Electro-Optics 2006 Technical Digest, Optical Society of America.

Oh et al. "Increased Pulsed Amplifier Efficiency by Manipulating the Fiber Dopant Distribution", 2 pp., CTuQ3, Conference on Lasers and Electro-Optics 2006 Technical Digest, Optical Society of America.

Dong et al. "Leakage Channel Optical Fibers with Large Effective Area", pp. 1689-1697, vol. 24, No. 8, Aug. 2007, Optical Society of America.

Marciante "Gain Filtering for Single-Spatial-Mode Operation of Large-Mode-Area Fiber Amplifiers", 2 pp., JTuA86, Conference on Lasers and Electro-Optics 2007 Technical Digest, Optical Society of America.

Betin et al. "200 W Phase-Conjugate Mirror for CW Radiation", pp. 1-6, Sciencedirect, Optics Communications, Feb. 26, 2008.

Galvanauskas et al. "Effectively-Single-Mode Large Core Passive and Active Fibers with Chirally-Coupled-Core Structures", 2 pp., CMB1, Conference on Lasers and Electro-Optics 2008 Technical Digest, Optical Society of America.

Koplow et al. "Single-Mode Operation of a Coiled Multimode Fiber Amplifier", pp. 442-444, Optics Letters, vol. 25, No. 7, Apr. 1, 2000, Optical Society of America.

* cited by examiner

MONOLITHIC PUMP COUPLER FOR HIGH-ASPECT RATIO SOLID-STATE GAIN MEDIA

BACKGROUND

The present disclosure relates to an optical fiber coupler for coupling pump radiation into an optical fiber, and a method for manufacturing the optical fiber coupler.

Gain media based on optical fibers (e.g., fiber lasers and amplifiers) are finding increasing applications in advanced laser sensor systems. These gain media based on optical fibers (e.g., fiber lasers and amplifiers) have a broad range of performance features including high efficiency, robust single-mode output, high reliability, compact coiled packaging, large surface-area-to-volume ratio for favorable thermal performance, and an all-fiber architecture without any free-space optics (i.e., no requirement for a rigid optical bench). Over the past decade, the output powers of fiber lasers have increased by several orders of magnitude, for example, from the watt-level to multi-kW powers.

U.S. Pat. No. 5,864,644, the entirety of which is hereby incorporated by reference, describes a Tapered Fiber Bundle (TFB) for coupling light into and out of cladding-pumped fiber devices. According to this architecture, a group of multi-mode pump fibers are combined with a single-mode signal fiber to form a close-packed bundle. This close-packed bundle is then heated and stretched to produce a tapered bundle with a final diameter approximately equal to the diameter of one of the original fibers. For example, a bundle of six pump fibers and one signal fiber (e.g., each having a diameter of 125 µm) has an initial cross-sectional dimension of 375 µm (i.e., 3×125 µm). When heated and tapered, the final TFB will have a diameter of 125 µm, and will contain the original power in all of the input fibers with insertion losses kept within a few percent. The TFB is then fusion-spliced to form a double-clad, or cladding pumped, gain fiber in which all of the pump power efficiently enters the pump cladding, where it will ultimately be absorbed by the active doped core. The signal beam also efficiently passes through the TFB into the core of the gain fiber. TFBs are widely recognized as one of the enabling technologies supporting development of high-power fiber lasers and amplifiers. In all known types of TFBs, the pump and signal beams propagate through independent circular cores that provide index-based guiding in all transverse directions. The tapered architecture may generate optical power losses, and these losses may pose thermal loading challenges for high pump powers.

U.S. Pat. No. 6,477,295, the entirety of which is hereby incorporated by reference, describes a bulk pump-coupling block of glass that is bonded to a fiber for which the outer cladding is removed. Pump light is then directed into the block in a manner such that it will enter the gain fiber at the boundary of the block with the gain fiber. This reference envisions a free-space coupling. Thus, this design does not provide an all-fiber monolithic design. This reference also requires that the fiber core be continuous and uninterrupted throughout the coupler, making the fabrication of the pump-coupling block very challenging, and requiring a significant amount of handling of raw, uncoated fiber, which might pose a possibility of contaminating the fiber surface. Also, any pump power that has not been absorbed (i.e., by the time it propagates to the next pump coupler down the fiber length) will be lost unless additional modifications are made to the fiber. Further, the design disclosed in this reference also requires precise matching of the indices.

U.S. Pat. No. 6,529,318, the entirety of which is hereby incorporated by reference, describes a prism-coupling approach that is conceivably scalable to relatively high powers. This reference describes several approaches whereby prisms attached to flat surfaces on a gain fiber are used to reflect pump beams into a gain fiber. This reference only considers prisms that direct free-space pump beams into the gain fiber. Thus, this reference does not provide an all-fiber monolithic design. The architecture disclosed in this reference is inherently single-sided (i.e., one cannot inject pump light from two opposite sides of the fiber at the same location), thereby reducing the possible pump power per injection point. Although rectangular claddings are envisioned in this reference, this reference does not disclose a high-aspect ratio rectangular core or a semi-guiding core. A high-aspect ratio rectangular core is a core shaped as a rectangle rather than a circle, where one dimension of the rectangle, the slow-axis direction, is much larger (e.g., by a factor of 10 to 100 or more) than the other dimension of the rectangle, the fast-axis direction, and in which index-based guiding is employed at all four core-cladding interfaces. The high-aspect ratio rectangular core is considered in the art to be "semi-guiding" if the index-based guiding is employed in only one transverse direction (i.e., the fast-axis direction). Further, the optical adhesive used to attach the prism to the fiber may lead to reliability problems due to the degradation of the adhesive under strong illumination of the pump source.

What is needed, then, is a means of coupling pump power into the rectangular cross-section core gain fiber that does not involve any free-space optics and/or does not pose thermal loading challenges for high pump powers.

SUMMARY

According to one aspect of the present disclosure, an optical fiber coupler for coupling pump radiation into a rectangular optical fiber is provided. The optical fiber coupler includes a fiber section and a pump fiber. The fiber section includes a core having a high aspect ratio cross-section with a fast-axis dimension and a slow-axis dimension, and an interface section. The core is positioned in contact with first and second signal claddings to form reflective boundaries at the fast-axis boundaries of the core. The pump fiber is coupled to the fiber section via the interface section, and is configured to couple the pump radiation into the fiber section.

According to another aspect of the present disclosure, a method of manufacturing a pump coupler is provided. The method includes providing an interface section that includes at least one pump fiber, and joining the interface section to a coupler section. The at least one pump fiber is configured to couple pump radiation into the coupler section. The coupler section includes a core having a high aspect ratio cross-section with a fast-axis dimension and a slow-axis dimension. The core is positioned in contact with first and second signal claddings to form reflective boundaries at fast-axis boundaries of the core.

Other features of one or more embodiments of the present disclosure will become apparent from the following detailed description, accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 1:
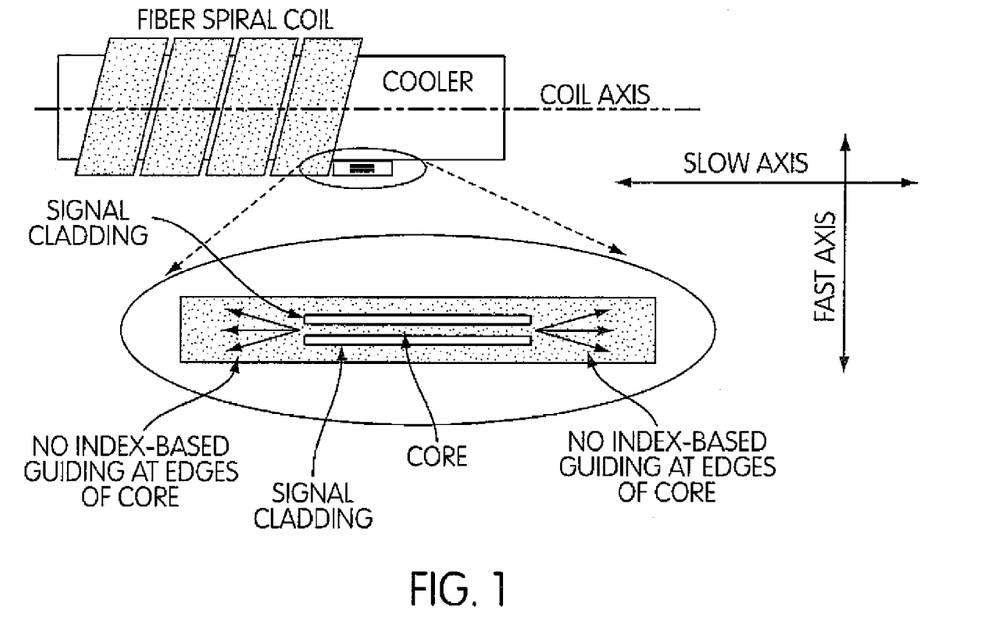
FIG. 1 illustrates a semi-guiding high aspect ratio core (SHARC) high-power fiber laser.

A semi-guiding high-aspect ratio core (SHARC) fiber architecture that is scalable to high power levels is disclosed in co-pending U.S. patent application Ser. No. 11/891,328, filed on Aug. 9, 2007 and entitled "Method and Apparatus for Generation and Amplification of Light in a Semi-Guiding High Aspect Ratio Core Fiber," which is incorporated herein by reference in its entirety. The cross-section of a SHARC fiber amplifier is schematically shown in FIG. 1. Signal cladding layers are positioned in contact with the core to provide fast-axis waveguiding by means of total internal reflection. In the horizontal (i.e., slow-axis) direction, the material properties are designed to minimize any abrupt changes in the refractive index at the slow-axis edges of the core. The aspect ratio of the rectangular core may range from 30:1 to 100:1, or more depending on the desired power goal. The power scalability arises from the fact that the slow-axis dimension may be increased linearly with power such that the power is scaled accordingly. Hence, processes that limit the increase in power, such as optical damage and stimulated scattering, are held constant as the power is increased. Therefore, excellent beam quality may be achieved even at high powers using the SHARC fiber architecture. In addition, since the fast-axis dimension is maintained relatively small, the SHARC fiber may be coiled as easily as a conventional fiber.

More specifically, as discussed in U.S. patent application Ser. No. 11/891,328 (the '328 application), mentioned above, the SHARC fiber of the present application may include a refractive index map as shown and explained with respect to FIG. 13. Further, as discussed in the '328 application, the SHARC fiber 130 includes a high aspect-ratio core 132 of width $w_0$ and height (or thickness) $h_0$, with a top wide interface 140, a bottom wide interface 142, and two narrow edge interfaces 144 and 146.

Figure 13:
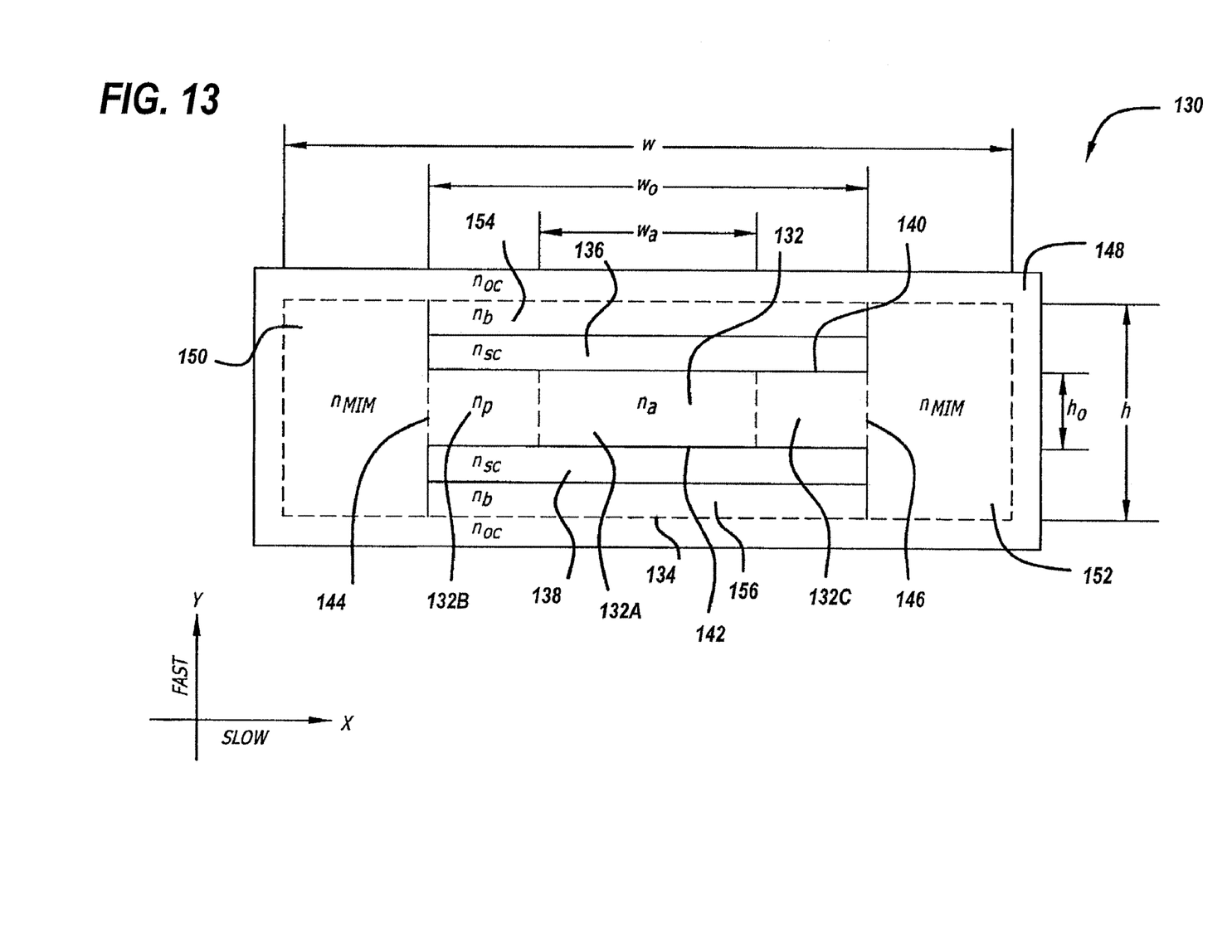
FIG. 13 is a simplified schematic of a cross-sectional view of an illustrative SHARC fiber designed in accordance with an illustrative embodiment of the present application, showing a refractive indicies over a fiber slice.

In the illustrative embodiment of FIG. 13, the core 132 is shown divided into three adjacent regions: an active core region 132A of width $w_a$ and refractive index $n_a$ that is doped with a laser-active ion, and passive core regions 132B and 132C having a refractive index $n_p$ and located on either edge of the active core region 132A. This division is optional, and is shown here to represent the most general case. In practice, the active core region 132A could be as much as 100% of the full core width, or $w_a=w_o$; the relative width of the active core region is a design parameter that can be specified to optimize mode discrimination and/or mode-index matching.

An inner cladding 134 of height h and width w, comprised of two signal claddings 136 and 138 and two edge sections 150 and 152, surrounds the core 132. The first signal cladding 136 lies above the core 132 in contact with the top interface 140, and the second signal cladding 138 lies below the core 132 in contact with the bottom interface 142. The edge sections 150 and 152 are located to the sides of the core 132 and claddings 136 and 138, in contact with the narrow interfaces 144 and 146, respectively.

In an illustrative embodiment, the laser gain medium is configured as a thin glass foil. This foil has an embedded planar core with planar signal claddings, and a mode-index matching (MIM) material along the core edges. The MIM material has a refractive index such that the core is optically "open" (i.e. there are no reflections) at the core-MIM material interface, allowing the amplified signal to overfill the active portion of the core in the slow-axis direction.

The inner cladding 134 may be surrounded by an outer cladding 148 having a refractive index $n_{oc}$. The outer cladding 148 could be a polymer, a glass, or even air, depending on the application. The fiber 130 may also include optional ballast regions 154 and 156, having a refractive index $n_b$, above and below the signal claddings 136 and 138, respectively, lying between the signal cladding and the outer cladding 148. The homogeneity of the core regions 132 and the shape and flatness of the interfaces 140 and 142 with the signal claddings 136 and 138 should be controlled for the best signal beam quality. However, the homogeneity and shapes of the other regions and interfaces are not so critical and could even be curved.

In accordance with the present teachings, total internal reflection is used to trap light in the core 132 in the fast-axis direction. The signal claddings 136 and 138 have an index of refraction $n_{sc}$ that is smaller than the indices of refraction $n_a \approx n_p$ of the core 132, such that light in the core 132 is trapped by TIR at the top and bottom interfaces 140 and 142. Alternatively, instead of TIR arising from a core-cladding refractive-index difference, some other mechanism such as a photonic band gap (PBG) structure can be employed to accomplish the guiding function.

In a preferred embodiment, the numerical aperture (NA) and the thickness $h_0$ of the core 132 are matched to make the core 132 single-mode in the fast-axis direction. This can be done by satisfying the well known condition, $h_0 \approx \lambda(2\Delta n \cdot n_a)^{1/2}$, where $\lambda$ is the wavelength of the laser and $\Delta n$ is the core-cladding index difference. Alternatively, the SHARC fiber 130 can be designed analogous to a LMA fiber, whereby the core guides a few fast-axis modes, and the SHARC fiber 130 is wound around a cylinder at a prescribed coil radius to remove the higher-order modes. For reference, a standard core/cladding combination gives $h_0 \approx 5\text{-}10$ μm at a $NA_{core} \approx 0.2$ for single-mode circular fibers. The core size becomes about 20-30 μm for a $NA_{core} \approx 0.05$ for a LMA fiber core that simultaneously guides a few modes and where coiling is used for stripping off higher modes. Similar approximate relations between the core thickness and its NA can be used for the SHARC fiber 130 of the present invention. TIR from the lower-index cladding, then, facilitates beam quality with respect to the fast axis in the SHARC fiber 130.

Given the uniqueness of the slow-axis mode control employed in this invention, it is appropriate to describe how this affects the fiber design. Referring to FIG. 13, the best mode control can be obtained when the refractive index is essentially constant across the slow-axis interfaces 144 and 146 of the core 132, because this will minimize reflections. The refractive index $n_{MIM}$ of the mode-index matching (MIM) material 150 and 152 at the edges of the core 132 can be controlled by specifying the appropriate dopant concentrations in those sections 150 and 152 of the fiber 130. It is useful to note that the effective index, $n_{mode}$, of any given mode is typically not either $n_a$ or $n_{sc}$, but lies somewhere between those limits. The reason for this is that the electromagnetic fields that constitute the mode extend beyond the core 132 into the signal cladding 136 and 138, and also possibly into the surrounding ballast material 154 and 156. Hence, the objective of minimizing reflections at the edges of the core 132 can be achieved by designing the fiber such that $n_{MIM} \approx n_{mode}$. Thus, the material at the slow-axis edges does not actually function as "cladding"; its refractive index is chosen to provide a neutral condition, i.e. to lie in the middle between guiding and anti-guiding to eliminate trapping the light at the edges. The term "modes" for the illustrative SHARC fiber laser design should be clarified: the SHARC fiber has waveguide modes along the fast axis, while having laser resonator modes along the slow axis or having no index-guided modes at all for the slow-axis direction if an amplifier configuration is applied.

In a preferred embodiment, the following two conditions should be fulfilled to reach the design goal of optically open edges: 1) the indices, $n_{sc} < n_{MIM} < n_{a,p}$, should all be different, and 2) the guided-mode index $n_{mode}$ should match $n_{MIM}$, the index at the edges of the core.

In practice, either imperfect mode matching between $n_{mode}$ and $n_{MIM}$, or some other possible effects arising at the edges of the core, may be sufficient to cause the formation of modes as opposed to free diffraction in the slow-axis direction. The impact of any such modes can be minimized by ensuring that these undesired modes are leaky, i.e., that the power in such a mode will tend to migrate to the MIM material outside of the core edges, away from the gain stripe. One way to make modes leaky is to purposely violate the nominal equality between $n_{mode}$ and $n_{MIM}$.

Any suitable refractive index $n_b$ can be used for the ballast material in sections 154 and 156, immediately above and below the signal claddings 136 and 138, respectively. For example, the signal claddings 136 and 138 can extend to the top and bottom surfaces of the inner cladding 134, which essentially corresponds to $n_b = n_{sc}$. Alternatively, the material for the ballast sections 154 and 156 can be chosen to be the same as the material on the core edges, $n_b = n_{MIM}$. The index for the areas 154 and 156 can also be chosen to lie between those values, or slightly beyond this range. A final choice becomes a matter of performance optimization, manufacturing convenience, and outer cladding requirements for pump guiding. The outer cladding 148 may be used to guide the pump light and also to isolate the pump light from the external environment. The refractive index of the outer cladding, $n_{oc}$, should be less than the index of any material that constitutes the inner cladding 134.

In the SHARC fiber architecture, index-based guiding is employed in only one transverse direction (i.e., the fast-axis direction), and thus the term "semi-guiding." Higher-order planar fast-axis modes are stripped out of the core by coiling the fiber, analogous to the approach used with conventional large-mode area (LMA) fibers. In the SHARC fiber architecture, the index-based guiding is not employed in the slow-axis direction mainly because it would lead to highly multimode operation. Instead an alternative form of spatial mode control is employed.

When the SHARC fiber is employed as a laser oscillator, a single-mode performance in the slow-axis direction may be achieved using a low-Fresnel number resonator in that plane. Generally, this type of long and thin resonator is readily available, and is well known to produce diffraction-limited output beams. When the SHARC fiber is employed as an amplifier, mode control may be achieved using a combination of mode-dependent gain and mode-dependent loss, such that the lowest-order mode has the greatest gain-loss difference.

The present disclosure proposes a pump coupler configured to couple the outputs of multiple fiber-coupled semiconductor diode pump lasers into a gain fiber without any free-space optics (i.e., other than the micro-optics employed to couple diode laser beams, for example, into the pump fibers). This type of all-fiber capability avoids the use of complex free-space optics to shape the pump radiation and launch the pump radiation into the gain fiber. In general, as is known in the art, the free-space schemes typically require "fast" optics that are expensive and require precise alignment, and they must maintain that alignment precision over a wide range of operational thermal and vibrational environments.

The pump coupler may be attached to a rectangular gain fiber. The pump radiation is configured to pass through the pump coupler into the gain fiber. In one embodiment, the pump coupler may be spliced between two sections of gain fiber. The pump coupler of the present disclosure is designed such that it also propagates the signal from one gain fiber to the next.

The pump coupler of the present disclosure is configured in one or more embodiments to couple pump radiation into a semi-guiding high aspect ratio core (SHARC) fiber. As noted above, semi-guiding refers to the fact that the pump coupler provides index-based guiding in the narrow (fast-axis) direction, while free diffraction occurs in the wide (slow-axis) direction. The pump coupler of the present disclosure is designed such that it allows pump radiation to enter the gain fiber without imposing any appreciable loss on the signal beam, which also passes through the pump coupler. In order to accomplish this, the pump radiation is configured to enter and propagate at an angle relative to the fiber axis, thus, allowing the pump radiation to efficiently enter the gain fiber from the edge of the fiber and propagate along the plane of the semi-guiding core. The semi-guiding core of the pump coupler also efficiently carries the signal from one end to the other. Specifically, since the signal-beam fast-axis dimension may only be in the range of 20 μm, the guiding in that direction is absolutely essential for efficient propagation of the beam from one gain fiber through the pump coupler into the next gain fiber. The slow-axis signal-beam dimension may be approximately around 1 mm or more. Since the length of the pump coupler length may approximately range from 5 to 10 mm, very little diffraction occurs in the wide direction (i.e., slow-axis signal-beam dimension), so no guiding is required by the pump coupler in the slow-axis signal-beam dimension.

Figure 2A:
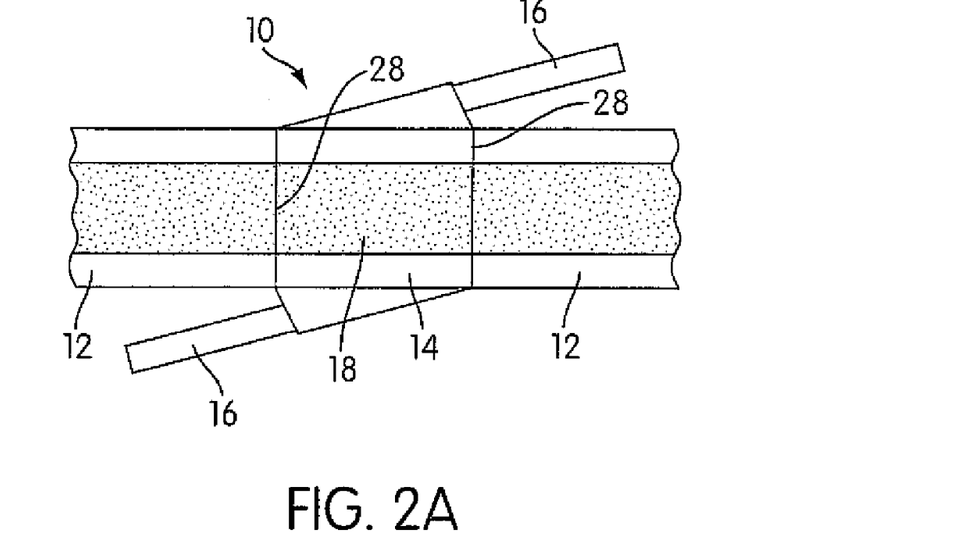
FIG. 2A illustrates a schematic of a pump coupler with two pump fibers, wherein the pump coupler is located between two gain fibers in accordance with an embodiment of the present disclosure.
Figure 2B:
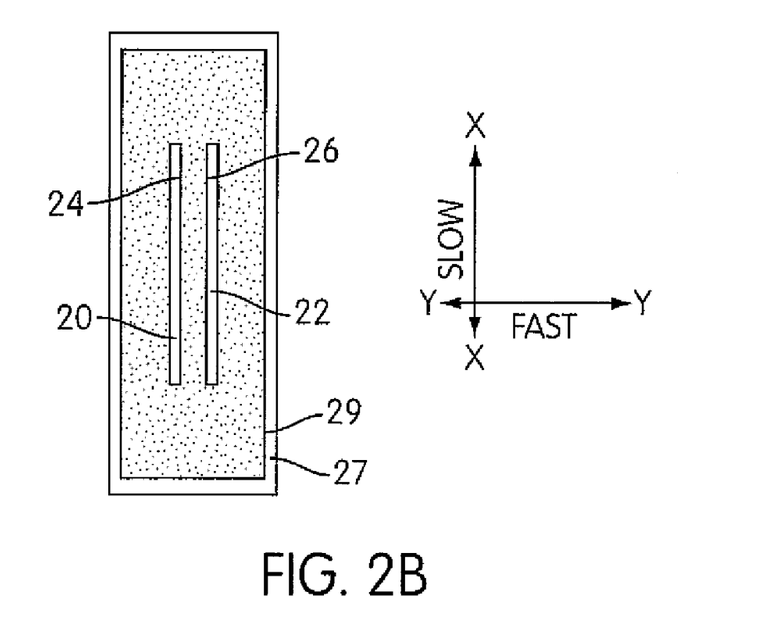
FIG. 2B illustrates a cross-sectional view of the pump coupler in accordance with an embodiment of the present disclosure.

FIGS. 2A and 2B show a schematic of a pump coupler or optical fiber coupler 10 in accordance with an embodiment. Pump coupler 10 is configured for coupling pump radiation into rectangular optical fiber 12 (only a short section of which is illustrated). Pump coupler 10 includes fiber section 14 and pump fiber 16. Fiber section 14 includes semi-guiding core 18 having a high aspect ratio cross-section (i.e., the width of core 18 can exceed the thickness of core 18, for example, by a factor greater than 50) with a fast-axis dimension Y-Y and a slow-axis dimension X-X. Core 18 is positioned in contact with first and second signal claddings 20 and 22 to form reflective boundaries at fast-axis boundaries 24 and 26 of core 18. Pump fiber 16 is configured to couple the pump radiation into fiber section 14. Fiber section 14 includes joining or connecting portion or surface 28 that couples to rectangular fiber 12.

For high aspect-ratio core 18, the coordinate along the expanded dimension is traditionally referred to as the slow axis dimension X-X, while the narrow dimension is denoted the fast axis dimension Y-Y. The cross-sectional area of the expanded core is determined to maintain essentially constant and safe power intensity level as the total beam power is increased. The damage-limited output power increases proportionally to the increase of the slow-axis core dimension X-X.

In an illustrated embodiment, as shown in FIG. 2A, pump coupler 10 is located between two gain or optical fibers 12. Fiber section 14 is configured to propagate the signal between the two gain or optical fibers 12 with minimal loss. In the fast-axis direction Y-Y, where the signal beam size is approximately 20 μm, the beam is guided through coupler 10 by the index-based waveguide. As noted above, claddings 20 and 22 are positioned in contact with core 18 to provide fast-axis waveguiding by means of total internal reflection. As noted above, there is no guiding needed in the slow-axis direction X-X.

In one embodiment, gain fibers 12 and pump fibers 16 are made of a silica or a glass material. In another embodiment, gain fibers 12 and pump fibers 16 may be made of a polymer material, a plastic material, a fused silica material or other types of glass materials.

In one embodiment, a cross-section of pump fiber 16 is rectangular. In another embodiment, the cross-sectional shape of pump fiber 16 may be selected from the group consisting of a square, an ellipse, a circle, a triangle, a polygon, or any other desired shaped.

In one embodiment, core 18 of fiber section 14 may include a passive SHARC fiber. In other words, core 18 of coupler or fiber section 14 includes a material without gain. In another embodiment, core 18 of fiber section 14 may include an active SHARC fiber. In other words, core 18 of coupler or fiber section 14 includes a material with gain. The use of an active SHARC fiber would provide amplification in power.

In one embodiment, joining or connecting surface or portion 28 of fiber section 14 of pump coupler 10 is coupled to rectangular fiber 12 by fusion bonding.

In one embodiment, as shown in FIG. 2B, coating 27 is provided on outer surface 29 of pump coupler 10. In one embodiment, coating 27 is made from a polymer material, an acrylate material, or any other coating material appreciated by one skilled in the art. In one embodiment, coating 27 is configured to protect the fiber from breaking. In one embodiment, coating 27 is configured to control the range of angles internally reflected at surface 29. In one embodiment, coating 27 is configured to control or determine a numerical aperture of the gain fiber at outer surface 29 of pump coupler 10, where the numerical aperture of the gain fiber is approximately 0.45 or more. In other words, coating 27 is configured to determine how high the angle of incidence of the light or radiation can be at outer surface 29. In one embodiment, the numerical aperture is controlled or determined by changing the thickness of the coating, and/or material of the coating.

Figure 3:
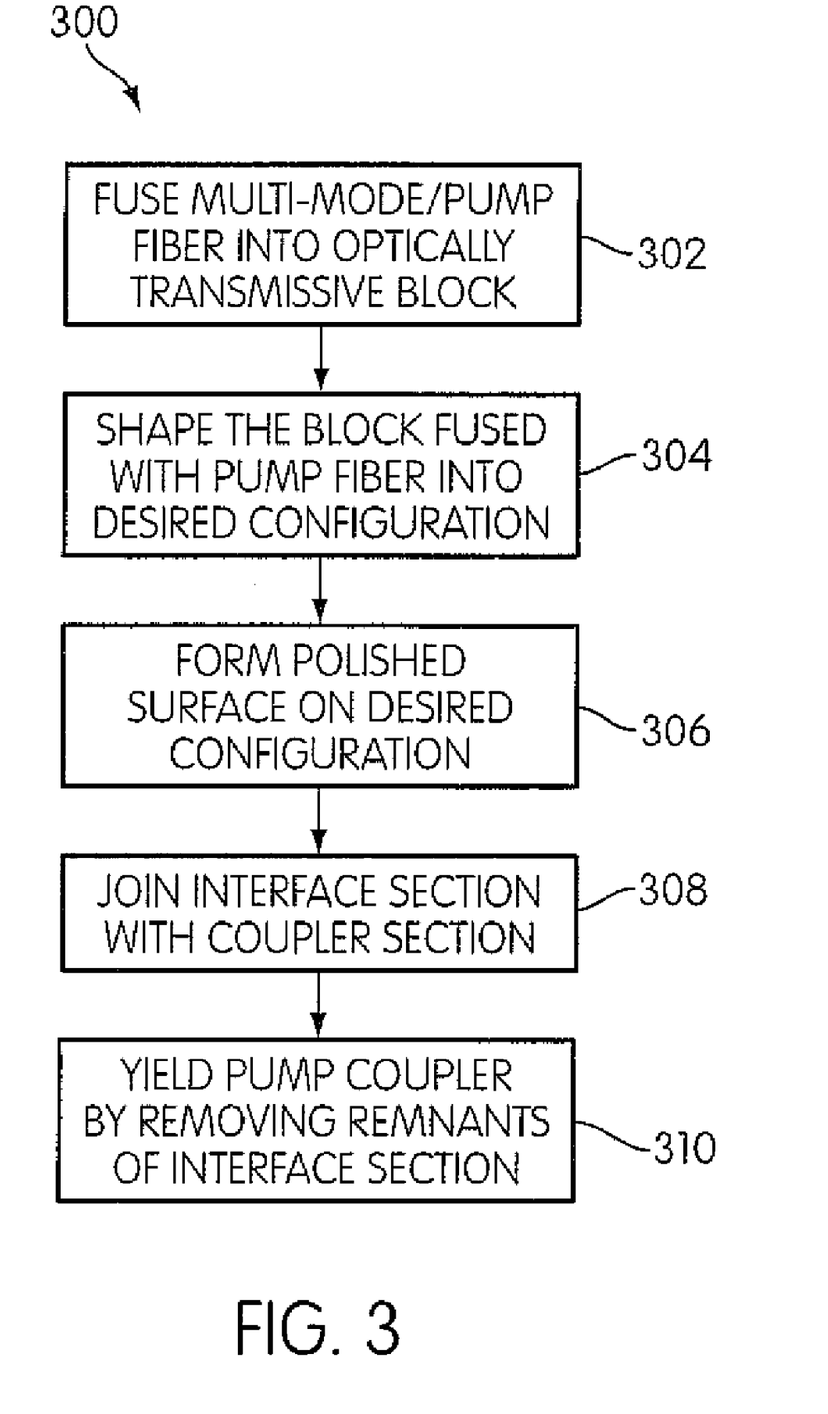
FIG. 3 illustrates a method of manufacturing the pump coupler in accordance with an embodiment of the present disclosure.
Figure 4A:
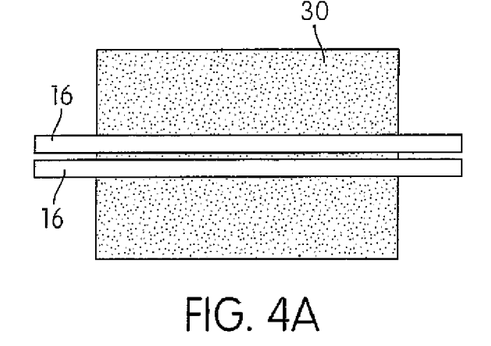
FIGS. 4A-E illustrate procedures in the method of manufacturing the pump coupler in accordance with an embodiment of the present disclosure.

FIG. 3 illustrates a method of manufacturing a pump coupler in accordance with an embodiment of the present disclosure. Method 300 begins at procedure 302. At procedure 302, as shown in FIG. 4A, multi-mode or pump fiber 16 (two are shown in the illustrated embodiment) capable of carrying the pump radiation is fused within optically transmissive block 30. In one embodiment, optically transmissive block 30 may be made of a silica or glass material. In another embodiment, the optically transmissive block 30 may be made of a polymer material, a plastic material or other types of glass materials.

Figure 4B:
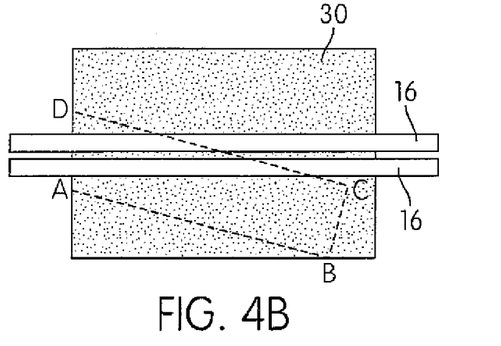

Method 300 then proceeds to procedure 304 in which block 30 that is fused with pump fiber 16 is shaped into a desired configuration 32. In the illustrated embodiment, as shown in FIG. 4B, a dashed line "ABCD" is shown to indicate a fabrication pattern in block 30. Block 30 is cut into desired configuration 32 along the fabrication pattern ABCD. In one embodiment, desired configuration 32 may be referred to as an interface section.

Figure 4C:
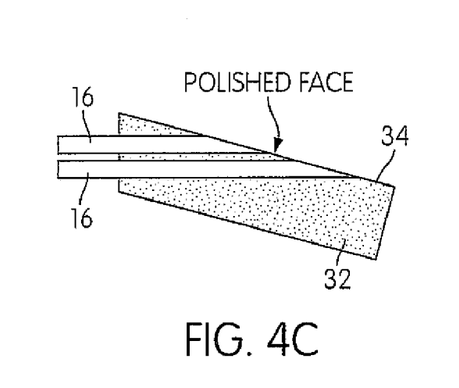

Method 300 then proceeds to procedure 306 in which polished surface 34 is formed on desired configuration 32. FIG. 4C illustrates interface section 32 with pump fibers 16 and polished surface 34.

Method 300 then proceeds to procedure 308 in which interface section 32 is coupled or joined with coupler or fiber section 14. As noted above and as shown in FIG. 2A, coupler section 14 includes core 18 having a high aspect ratio cross-section with fast-axis dimension Y-Y and slow-axis dimension X-X. Also, as shown in FIG. 2B, core 18 is positioned in contact with first and second signal claddings 20 and 22 to form the reflective boundaries at fast-axis boundaries 24 and 26 of core 18.

Figure 4D:
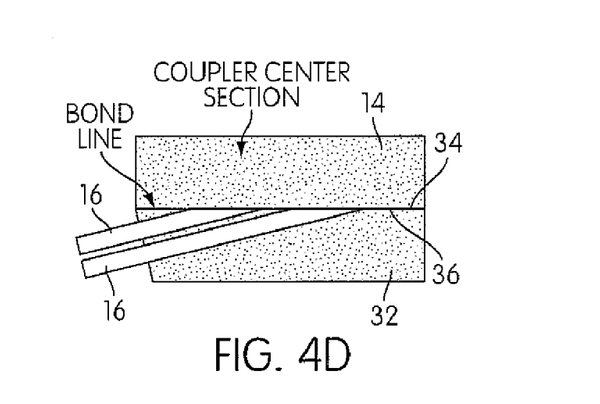

In one embodiment, joining interface section 32 to coupler section 14 includes bonding polished surface 34 of interface section 32 with surface 36 of coupler section 14. In one embodiment, interface section 32 that includes pump fiber 16 is constructed and arranged to facilitate a strong, high-quality bond. In one embodiment, polished surface 34 is made of sufficiently high quality so that it can be bonded to coupler section 14 as is shown in FIG. 4D. In one embodiment, interface section 32 is joined to coupler section 14 using diffusion bonding. In another embodiment, interface section 32 is joined to coupler section 14 using silicate bonding, fusion splicing, adhesive bonding, or any other attachment mechanism appreciated by one skilled in the art.

Figure 4E:
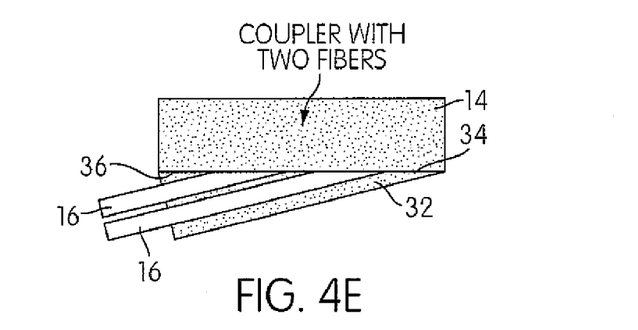

Method 300 then proceeds to procedure 310 in which the remnants of interface section 32 are removed to yield a final single-sided coupler, as shown in FIG. 4E. In method 300, pump fibers 16 are attached on only one side of fiber section or coupler section 14 forming a single-sided coupler configuration. Second pump fiber may be attached on an opposing side of fiber section 14 forming a double-sided coupler configuration as shown in FIG. 2A. A method similar to method 300 may be employed to produce the double-sided coupler as shown in FIG. 2A, with all of the bonding being done before the final shaping of interface sections 32. The use of more than two fibers is possible.

In one embodiment, as shown in FIGS. 4A-4E, fusing pump fiber 16 with optically transmissive block 30 includes penetrating pump fiber 16 all the way through desired configuration 32 to polished surface 34 of interface section 32. In another embodiment, fusing pump fiber 16 with optically transmissive block 30 includes terminating pump fiber 16 at an intermediate section, wherein the intermediate section is positioned in between an entry section of the interface section and polished surface 34 of interface section 32.

Figure 5:
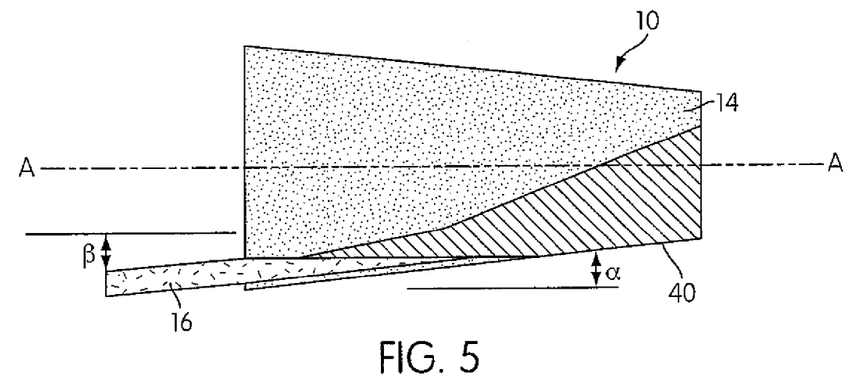
FIG. 5 illustrates a ray tracing analysis performed for a pump coupler having a single pump fiber, which is configured to couple pump radiation into the fiber section in accordance with an embodiment of the present disclosure.

FIG. 5 illustrates a ray tracing analysis performed for the single-sided pump coupler 10 having single pump fiber 16 that is configured to couple pump radiation into fiber section 14 in accordance with an embodiment. Single pump fiber 16 may be configured to couple the pump radiation through the end of coupler 10. The cross-hatched area in the drawing represents the pump-radiation path within coupler 10. As shown in FIG. 5, pump fiber 16 makes an angle β with coupler axis A-A. Edge surface 40 of interface section 32 makes an angle α with the coupler axis A-A. Angles α and β are design parameters for pump coupler 10 that can be optimized for best performance of pump coupler 10.

A series of geometrical ray trace analyses were performed on pump coupler 10 shown in FIG. 5, and it was found that almost all of the pump radiation from the pump fiber(s) is entering the gain fiber (not shown in FIG. 5) within the allowed numerical aperture of the gain fiber, and with essentially no loss.

Figure 6:
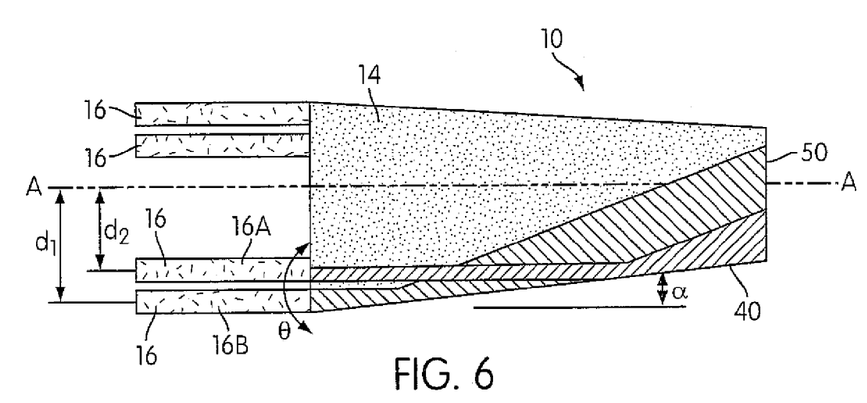
FIG. 6 illustrates a ray tracing analysis performed for a pump coupler having four pump fibers that are configured to couple pump radiation into the fiber section in accordance with an embodiment of the present disclosure.

FIG. 6 illustrates a ray tracing analysis performed for pump coupler 10 having four pump fibers 16 that are configured to couple pump radiation into fiber section 14 in accordance with an embodiment of the present disclosure. In the illustrated embodiment shown in FIG. 6, two pump fibers 16 couple or launch pump radiation (e.g., light) from each of the opposite edges of coupler 10. The fibers of the coupler shown in FIG. 6 are oriented parallel to the axis of the coupler A-A. In another embodiment, the pump radiation may enter pump coupler 10 at an angle θ, for example, as shown in FIGS. 11a-11c and 12.

The cross-hatched areas in the FIG. 6 represent two of the pump beams on one side of coupler 10. Once the pump radiation enters pump coupler 10, it is reflected by edge surface 40 that is oriented at the angle α relative to the coupler axis A-A. In one embodiment, angle α is chosen such the radiation or light from both fibers 16 on that side of coupler 10 is reflected into the gain fiber (not shown) positioned at the right-hand end of pump coupler 10, within the numerical aperture of the gain fiber.

FIG. 6 shows that the pump radiation from each pump fiber (two fibers 16A and 16B are shown in the illustrated embodiment) are reflected by the edge surface 40 such that the pump radiation passes through pump coupler end 50 into the adjoining gain fiber (not shown).

A series of geometrical ray trace analyses were performed on pump coupler 10 shown in FIG. 6, and it was found that almost all of the pump radiation from the pump fiber(s) is entering the gain fiber (not shown in FIG. 6) within the allowed numerical aperture of the gain fiber, and with essentially no loss.

Figure 11A:
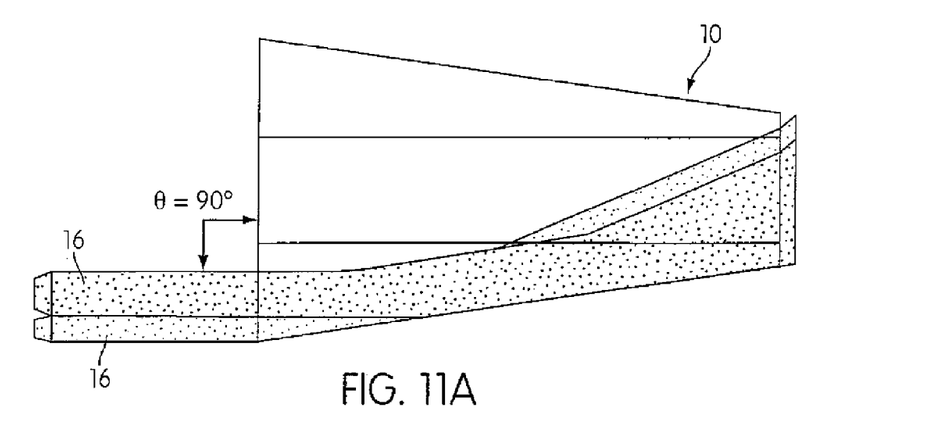
FIG. 11A illustrates a geometric ray tracing analysis performed for a pump coupler having two pump fibers that are configured to couple pump radiation into a fiber section, wherein the pump radiation is entering the coupler with θ=90 degrees in accordance with an embodiment of the present disclosure.

FIG. 6 shows an inboard pump fiber 16A positioned at distance $d_2$ from coupler axis A-A and an outboard pump fiber 16B positioned at distance $d_1$ from coupler axis A-A. When pump fibers 16A and 16B are oriented parallel to the coupler axis A-A, it is desirable to have pump fibers 16A and 16B not penetrate very far into pump coupler 10. In other words, if the inboard pump fiber 16a penetrates into the pump coupler much beyond where the pump radiation from the outboard pump fiber 16B is reflected by edge surface 40, then inboard pump fiber 16A may block much of the pump radiation from outboard pump fiber 16B. In one embodiment, the distance by which the pump fibers may penetrate into the pump coupler may depend on the angle at which the pump radiation enters the pump coupler. That is, for example, deeper penetrations of the pump fibers into the pump coupler are possible by increasing angle θ as shown in FIG. 11A.

In one embodiment, as shown in FIG. 6, all pump fibers 16 are configured to couple the pump radiation to the pump coupler, from the same direction. In another embodiment, as shown in FIG. 2A, pump fibers 16 may be configured to couple the pump radiation to the pump coupler from opposite directions. In other words, as shown in FIG. 2A, pump fiber 16 positioned on the top of pump coupler 10 is configured to couple pump radiation coming in from a right to left direction, and pump fiber 16 positioned on the bottom of pump coupler 10 is configured to couple pump radiation coming in from a left to right direction. Some applications may benefit from use of some of each type of these pump couplers. For example, in a distributed-pump architecture where pump couplers are distributed along the length of the gain fiber, the pump couplers at either end of the fiber will be unidirectional, while those located away from the ends will be bidirectional.

Figure 7:
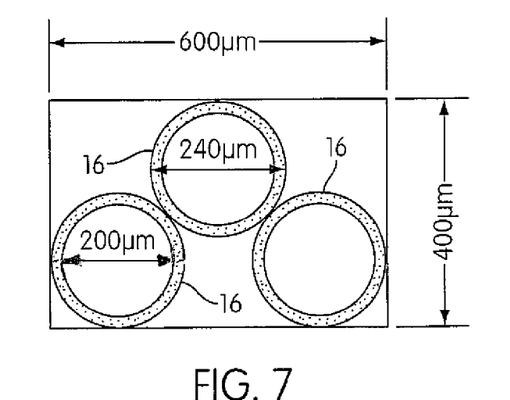
FIG. 7 illustrates an end view of a pump coupler having three pump fibers positioned in a pump coupler facet in accordance with an embodiment of the present disclosure.

The pump coupler in accordance with the embodiments of the present disclosure is compatible with two-dimensional arrays of pump fibers at the pump facets rather than just being a linear array, as shown in FIG. 6. Calculations for a representative multi-kW-class SHARC fiber amplifier using 200 µm core, 0.22 numerical aperture pump fibers indicate that such a two-dimensional array of pump fibers is compatible with the dimensions and acceptance angles of the gain fiber. FIG. 7 shows a pump coupler used for such a fiber amplifier that allows pump facets having dimensions of 600 µm wide by 400 µm high. FIG. 7 illustrates how a two-dimensional array of three pump fibers 16 could be located in that area (i.e., having dimensions of 600 µm wide by 400 µm high). In the illustrated embodiment, each pump fiber is configured to retain its own independent cladding. However, in another embodiment, the pump fibers are partially fused together such that they share a common cladding, thus, allowing a higher pump-fiber packing density.

In one embodiment, for a given size of a pump facet, additional pump fibers may be accommodated. For example, rectangular-core pump fibers may be used to significantly increase the spatial fill factor of the pump facet as compared with an array of circular-core fibers. In one embodiment, the non-circular (e.g., rectangular or square) core pump fibers may be used to allow more efficient coupling from the pump diodes into the pump fibers, thus, improving the overall system efficiency. In another embodiment, some degree of fusing and tapering may be employed to fit more pump fiber cores (e.g., circular or rectangular) into the pump facet.

Figure 8A:
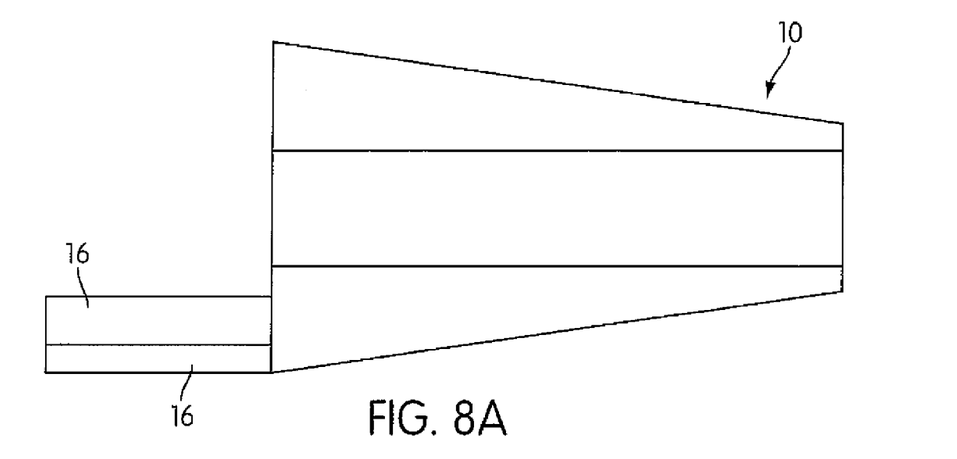
FIG. 8A illustrates a top plan view of a pump coupler in accordance with an embodiment of the present disclosure.
Figure 8B:
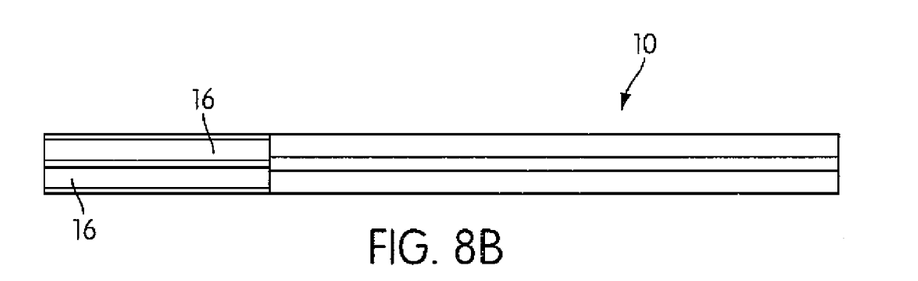
FIG. 8B illustrates an edge view of a pump coupler in accordance with an embodiment of the present disclosure.
Figure 8C:
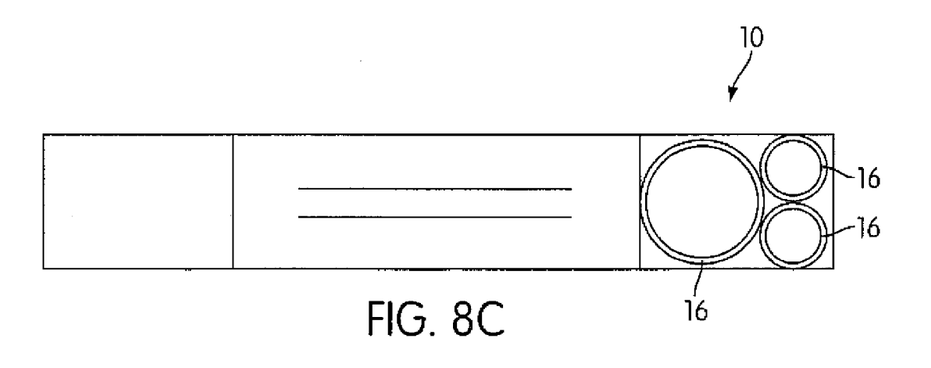
FIG. 8C illustrates an end view of a pump coupler in accordance with an embodiment of the present disclosure.

FIGS. 8A-8C illustrate different perspectives of the pump coupler, where the pump fibers are shown only on one edge of the pump coupler for clarity. However, in practice, there may be a set of pump fibers on both edges of the pump coupler.

In one embodiment, as shown in FIGS. 8A-8C, the length of the pump coupler, not including the pump fibers, is 0.5 mm. As shown in FIGS. 8A-8C, pump coupler 10 includes three pump fibers, where the pump fibers may have different sizes. For example, a larger diameter (i.e., 400 μm diameter) fiber may be used on the inner portion of the pump facet, and two smaller diameter (i.e., 200 μm diameter) fibers may be used on the outer portion of the pump facet. Two pump fibers 16, each having different diameters are used in pump coupler 10 shown in FIGS. 11A-11C. Therefore, in accordance with the embodiments of the present disclosure, any number of pump fibers may be used in the pump coupler. The number of pump fibers used in the pump coupler may be based on the pump power that needs to be coupled into the gain fibers. Also, each pump fiber used in the pump coupler may have different size.

In one embodiment, the annular thickness of the cladding for all three fibers is 20 μm. In the illustrated embodiment, as shown in FIGS. 8A-8C, the pump fibers of the pump coupler have no common or shared cladding between any of the pump fibers. In the illustrated embodiment, as shown in FIGS. 8A-8C, the numerical aperture for the pump fibers is 0.22, and the numerical aperture for the gain fiber is 0.45. For other numerical apertures, a new geometry may be found that will enable all of the pumped radiation to enter the gain medium.

Figure 9:
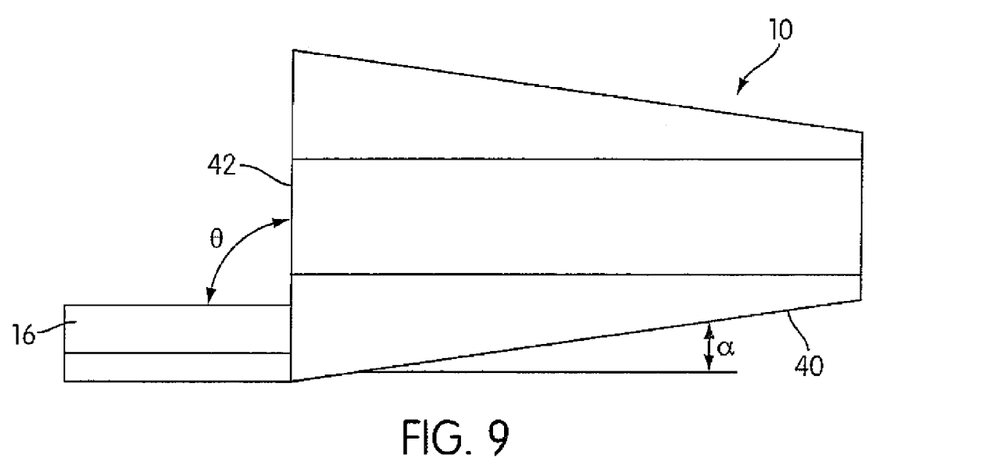
FIG. 9 illustrates a schematic of a pump coupler showing different angular dimensions in accordance with an embodiment of the present disclosure.
Figure 10:
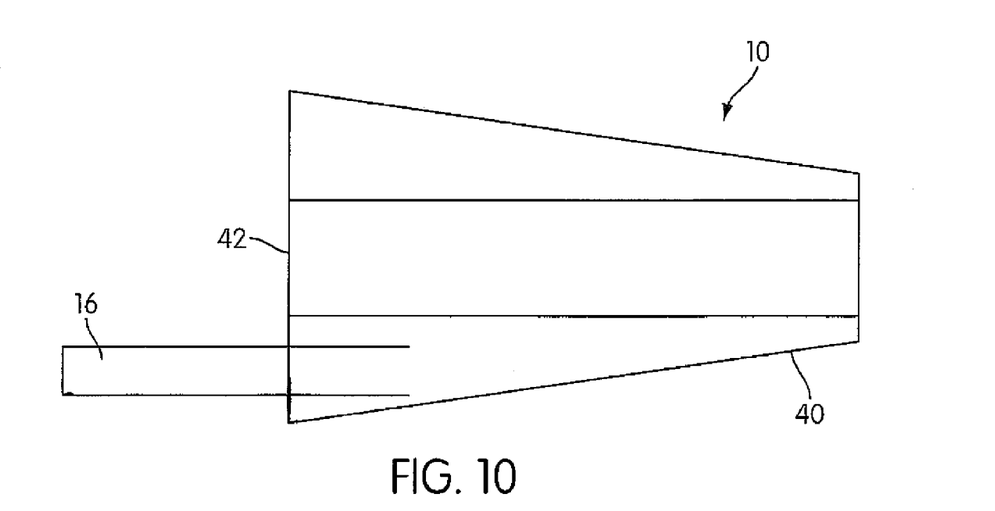
FIG. 10 illustrates a schematic of a pump coupler with pump fibers embedded into the pump coupler in accordance with an embodiment of the present disclosure.

FIG. 9 illustrates a schematic of pump coupler 16 showing different angular dimensions of the pump coupler in accordance with an embodiment. FIG. 9 shows pump coupler 10 in which α=8 degrees, θ=90 degrees, and pump fibers 16 are mounted directly to pump facets 42 of pump coupler 10. In another embodiment, as shown in FIG. 10, pump fibers 16 may be embedded into pump coupler 10 for a stronger structural design. Embedding pump fibers 16 into pump coupler 10 will have no impact on the actual laser performance.

Figure 11B:
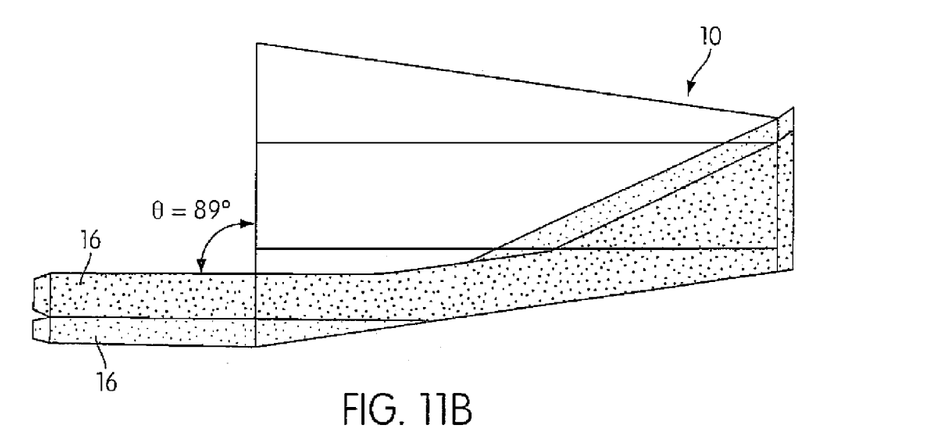
FIG. 11B illustrates a geometric ray tracing analysis performed for a pump coupler having two pump fibers that are configured to couple pump radiation into a fiber section, wherein the pump radiation is entering the coupler with θ=89 degrees in accordance with an embodiment of the present disclosure.
Figure 11C:
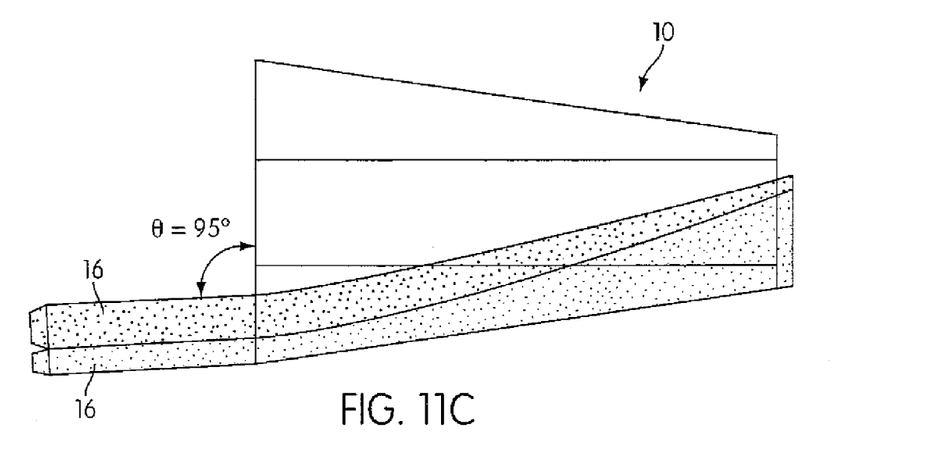
FIG. 11C illustrates a geometric ray tracing analysis performed for a pump coupler having two pump fibers that are configured to couple pump radiation into a fiber section, wherein the pump radiation is entering the coupler with θ=95 degrees in accordance with an embodiment of the present disclosure.

Two pump fibers 16 having different diameters are shown in the illustrated embodiment in FIGS. 11A-11C. FIGS. 11A-11C illustrate pump coupler 10 in which the pump radiation is entering pump coupler 10 at θ=90 degrees, 89 degrees, and 95 degrees, respectively.

A sensitivity analysis was performed to determine tolerances for specifying the angles of the pump coupler, for example, angle θ of the pump coupler. Based on the sensitivity analysis, it was determined that relatively large variations in the angles (i.e., on the order of degrees) may be tolerated without impacting the performance of the pump coupler. In other words, as long as the pump radiation passes or makes it to the end of the coupler without striking opposite or top side 44 of pump coupler 10 (as shown in FIG. 12), the design of the pump coupler is satisfactory.

FIG. 11A illustrates the pump radiation entering pump coupler 10 at θ=90 degrees. In other words, FIG. 11A provides a nominal alignment of the pump fibers in the pump coupler. FIG. 11B illustrates the pump radiation entering pump coupler 10 at θ=89 degrees. That is, as shown in FIG. 11B, a tolerance of a degree in the clock-wise direction may be achieved. FIG. 11C illustrates the pump radiation entering pump coupler 10 at θ=95 degrees. That is, as shown in FIG. 11C, a tolerance of about five degrees in the counter-clockwise direction may be acceptable. Angle θ of pump couplers 10 shown in FIGS. 11A-11C is within an acceptable range because the pump radiation of pump couplers 10 in FIGS. 11A-11C is making it to the end of pump coupler 10 without undergoing any total internal reflection at an opposite or top side of pump coupler 10.

Figure 12:
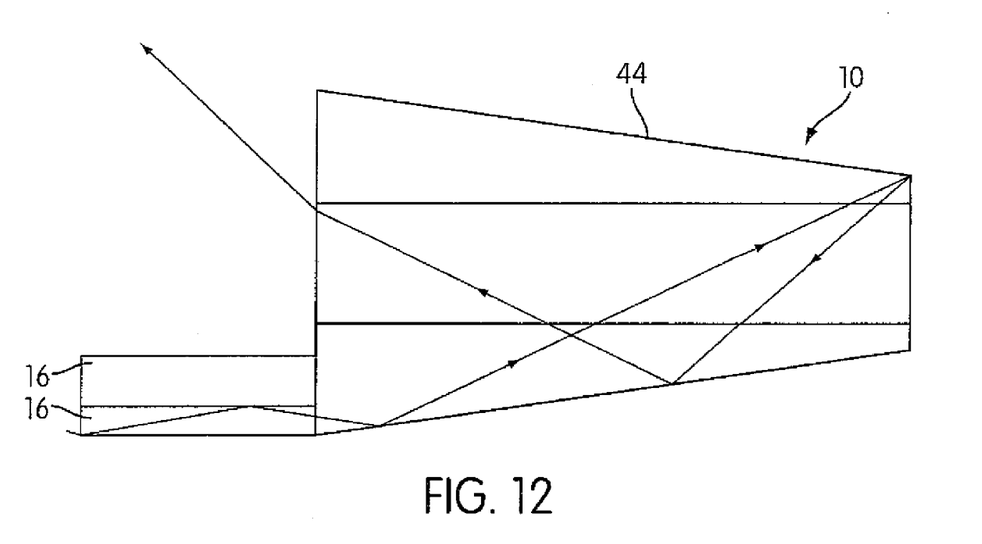
FIG. 12 illustrates a geometric ray tracing analysis performed for a pump coupler having two pump fibers that are configured to couple pump radiation into a fiber section, wherein the pump radiation is entering the gain fiber with θ=88 degrees in accordance with an embodiment of the present disclosure.

In contrast, if the pump radiation is hitting the opposite or top side 44 of coupler 10 as illustrated in FIG. 12, for example, then pump radiation may undergo a total internal reflection (TIR), and may not travel along its intended path. FIG. 12 shows an example of a pump coupler in which θ=88 degrees. As shown in FIG. 12, the pump radiation is hitting top side 44 of pump coupler 10 and is undergoing the total internal reflection, which is not desirable.

FIGS. 5, 6, 8A-8C, 9, 10, 11A-11C and 12 do not illustrate gain fibers 12 (as shown in FIG. 2A) positioned on ends or edges of pump coupler 10 for clarity. However, in practice, gain fiber 12 would be positioned on each edge of the pump coupler.

The present disclosure proposes an add-on optical fiber assembly useful with the SHARC fiber lasers. The pump coupler of the present disclosure provides a monolithic architecture in which the only free-space beam is the output beam. This monolithic architecture provides significant benefits in stability and reliability as compared with conventional solid-state laser devices. According to aspects of the present disclosure, the signal beam is generated and/or propagated within fibers, and pump beams are coupled into delivery fibers immediately at the output facet of the semiconductor diode pump lasers. In one embodiment, the pump couplers of the present disclosure allow an all-glass means for combining the pump beams with the signal beam. The ray-trace analysis described above shows that these pump couplers are efficient, and within acceptable manufacturing tolerances.

While the present disclosure has been described in connection with specific embodiments, it is to be understood that the inventive concept is capable of further modifications, and is not to be limited to the disclosed embodiments, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential hereinbefore set forth and followed in the spirit and scope of the appended claims.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

What is claimed is:

1. An optical fiber coupler for coupling pump radiation into a rectangular, semi-guiding high-aspect ratio core (SHARC) optical fiber, the SHARC optical fiber coupler comprising:
    a SHARC fiber section comprising a core having a high aspect ratio cross-section with a narrow, fast-axis dimension and a relatively wider, slow-axis dimension and an interface section, wherein the core is positioned in contact with first and second signal claddings to provide total internal reflections at only fast-axis boundaries of the core; and
    a pump fiber coupled to the SHARC fiber section via the interface section and configured to couple the pump radiation into the SHARC fiber section in a direction parallel to the first and second signal claddings so that the pump radiation enters through the narrow dimension so as to ensure homogenous thermal loading along a length of the SHARC fiber section.

2. The coupler of claim 1, wherein a cross-section of the pump fiber is rectangular-shaped.

3. The coupler of claim 1, wherein a cross-sectional shape of the pump fiber is selected from the group consisting of an ellipse, a circle, a triangle, and a polygon.

4. The coupler of claim 1, further comprising a plurality of pump fibers, wherein two or more pump fibers have different sizes.

5. The coupler of claim 1, wherein the pump fiber is attached on one side of the interface section forming a single-sided coupler configuration.

6. The coupler of claim 5, wherein a second pump fiber is attached to a second interface section on an opposing side of the fiber section forming a double-sided coupler configuration.

7. The coupler of claim 1, wherein the core of the fiber section comprises a material having a gain associated therewith.

8. The coupler of claim 1, wherein the core of the fiber section comprises a material without a gain therewith.

9. The coupler of claim 8, wherein the pump fibers are configured to propagate the pump radiation in opposite directions in the coupler.

10. The coupler of claim 8, wherein the pump fibers are configured to propagate the pump radiation in a same direction in the coupler.

11. The coupler of claim 1, further comprising a plurality of pump fibers configured to couple the pump radiation into the fiber section from opposite sides of the coupler.

12. The coupler of claim 1, further comprising a plurality of pump fibers configured to couple the pump radiation into the fiber section from a same side of the coupler.

13. The coupler of claim 1, further comprising a plurality of pump fibers oriented parallel to a central axis of the coupler.

14. The coupler of claim 1, wherein the pump radiation is configured to enter the coupler at an angle with respect to a central axis of the coupler.

15. The coupler of claim 1, wherein the coupler comprises a fused silica material.

16. The coupler of claim 1, further comprising a coating provided on an outer surface of the fiber section and the pump fiber.

17. The coupler of claim 16, wherein the coating comprises a polymer material.

18. The coupler of claim 1, wherein the SHARC fiber section is configured to provide anti-guiding at slow-axis boundaries of the core.

19. A method of manufacturing a pump coupler, the method comprising:
    providing an interface section comprising at least one pump fiber configured to couple pump radiation through the interface section into a semi-guiding high-aspect ratio core (SHARC) fiber section in a direction parallel to first and second SHARC signal claddings; and
    joining the interface section to the SHARC fiber section, wherein the SHARC fiber section comprises a core having a high aspect ratio cross-section with a narrow, fast-axis dimension and a relatively wider, slow-axis dimension, the core being positioned in contact with the first and second SHARC signal claddings to provide total internal reflections at only fast-axis boundaries of the core,
    wherein the SHARC fiber section is joined to the interface section to couple the pump radiation into the SHARC fiber section through the narrow dimension so as to ensure homogeneous thermal loading along a length of the SHARC fiber section, and
    wherein the high-aspect ratio core of the coupler is positioned to match a SHARC fiber core at signal input and output regions of the coupler.

20. The method of claim 19, wherein providing the interface section comprises:
    (a) fusing the at least one pump fiber with a optically transmissive block;
    (b) shaping the optically transmissive block fused with the at least one pump fiber into a desired configuration;
    (c) forming polished surfaces on the fiber section and the interface section prior to said joining step at joining portions thereof;
    (d) forming polished surfaces on the input and output regions of the coupler so as to facilitate joining of the coupler to a gain fiber; and
    (e) forming polished surfaces on sides of the fiber section and the interface section so as to enable the total internal reflections.

21. The method of claim 20, wherein fusing the at least one pump fiber with the optically transmissive block comprises penetrating one or more of the at least one pump fiber all the way through the desired configuration to the polished surface of the interface section.

22. The method of claim 20, wherein fusing the at least one pump fiber with the optically transmissive block comprises terminating one or more of the at least one pump fiber at an intermediate section, wherein the intermediate section is positioned between an entry section and the polished surface of the interface section.

23. The method of claim 19, wherein joining the interface section to the fiber section comprises bonding a polished surface of the interface section with a surface of the fiber section.

24. The method of claim 23, wherein the bonding comprises either diffusion bonding or silicate bonding.

25. The method of claim 19, wherein providing the fiber section comprises providing a material having a gain associated therewith.

26. The method of claim 19, wherein providing the fiber section comprises providing a material without a gain associated therewith.

27. The method of claim 19, further comprising controlling a numerical aperture of the fiber by providing a coating on an outer surface of the interface section and the fiber section.

28. The method of claim 19, wherein a cross-section of the pump fiber is rectangular-shaped.

* * * * *